United States Patent
Lee et al.

(10) Patent No.: US 8,300,691 B2
(45) Date of Patent: Oct. 30, 2012

(54) VIDEO ENCODING METHOD AND APPARATUS AND VIDEO DECODING METHOD AND APPARATUS USING RESIDUAL RESIZING

(75) Inventors: Tammy Lee, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1229 days.

(21) Appl. No.: 11/962,147

(22) Filed: Dec. 21, 2007

(65) Prior Publication Data

US 2008/0192825 A1  Aug. 14, 2008

Related U.S. Application Data

(60) Provisional application No. 60/901,112, filed on Feb. 14, 2007.

(30) Foreign Application Priority Data

May 7, 2007  (KR) .................. 10-2007-0044231

(51) Int. Cl.
  *H04N 7/12* (2006.01)
  *H04N 11/02* (2006.01)
  *H04N 11/04* (2006.01)
(52) U.S. Cl. ................................. 375/240.12
(58) Field of Classification Search ............ None
  See application file for complete search history.

(56) References Cited

U.S. PATENT DOCUMENTS

| | | | |
|---|---|---|---|
| 5,408,270 A * | 4/1995 | Lim | 375/240.25 |
| 7,835,452 B2 * | 11/2010 | Park et al. | 375/240.25 |
| 2002/0044601 A1 * | 4/2002 | Haskell et al. | 375/240.2 |
| 2003/0012279 A1 * | 1/2003 | Chaddha | 375/240.12 |
| 2005/0013373 A1 * | 1/2005 | Lin et al. | 375/240.18 |
| 2005/0213661 A1 | 9/2005 | Xiang et al. | |
| 2005/0213664 A1 * | 9/2005 | Mahkonen et al. | 375/240.17 |
| 2005/0259729 A1 | 11/2005 | Sun | |
| 2006/0083308 A1 * | 4/2006 | Schwarz et al. | 375/240.16 |
| 2006/0098739 A1 * | 5/2006 | Linzer | 375/240.16 |
| 2006/0209953 A1 * | 9/2006 | Jung et al. | 375/240.12 |
| 2006/0210156 A1 | 9/2006 | Lei et al. | |
| 2009/0168880 A1 * | 7/2009 | Jeon et al. | 375/240.16 |

FOREIGN PATENT DOCUMENTS

EP    1 551 184 A2   7/2005
WO   2006/039382 A2   4/2006

OTHER PUBLICATIONS

Communication dated Dec. 14, 2011, issued by the European Patent Office in corresponding European Patent Application No. 08704906.0.
"Recommendation H.263: Video coding for low bit rate communication" ITU-T Recommendation H.263, Feb. 1, 1998, pp. 129-154.
Salomon, "Data Compression: The Complete Reference, Subsampling," Jan. 1, 2004, p. 273, Section 4.3.1, Springer-Verlag.

* cited by examiner

*Primary Examiner* — Xavier Szewai Wong
(74) *Attorney, Agent, or Firm* — Sughrue Mion, PLLC (57) ABSTRACT

A video encoding method and apparatus and a video decoding method and apparatus are provided. The video encoding method encodes residual values included in a residual block of a current block after sub-sampling or down-sampling the residual values, thereby encoding and decoding the current block using a small number of residual values and thus improving the compression rate of video encoding.

13 Claims, 9 Drawing Sheets

VIDEO ENCODING METHOD AND APPARATUS AND VIDEO DECODING METHOD AND APPARATUS USING RESIDUAL RESIZING

CROSS-REFERENCE TO RELATED PATENT APPLICATION

This application claims priority from Korean Patent Application No. 10-2007-0044231, filed on May 7, 2007, in the Korean Intellectual Property Office, and the benefit of U.S. Provisional Patent Application No. 60/901,112, filed on Feb. 14, 2007, in the U.S. Patent and Trademark Office, the disclosures of which are incorporated herein in their entirety by reference.

BACKGROUND OF THE INVENTION

1. Field of the Invention

Methods and apparatuses consistent with the present invention relate to a video encoding method and apparatus and a video decoding method and apparatus, and more particularly, to a method and apparatus for efficiently encoding and decoding a residual block of a current block.

2. Description of the Related Art

Figure 1:
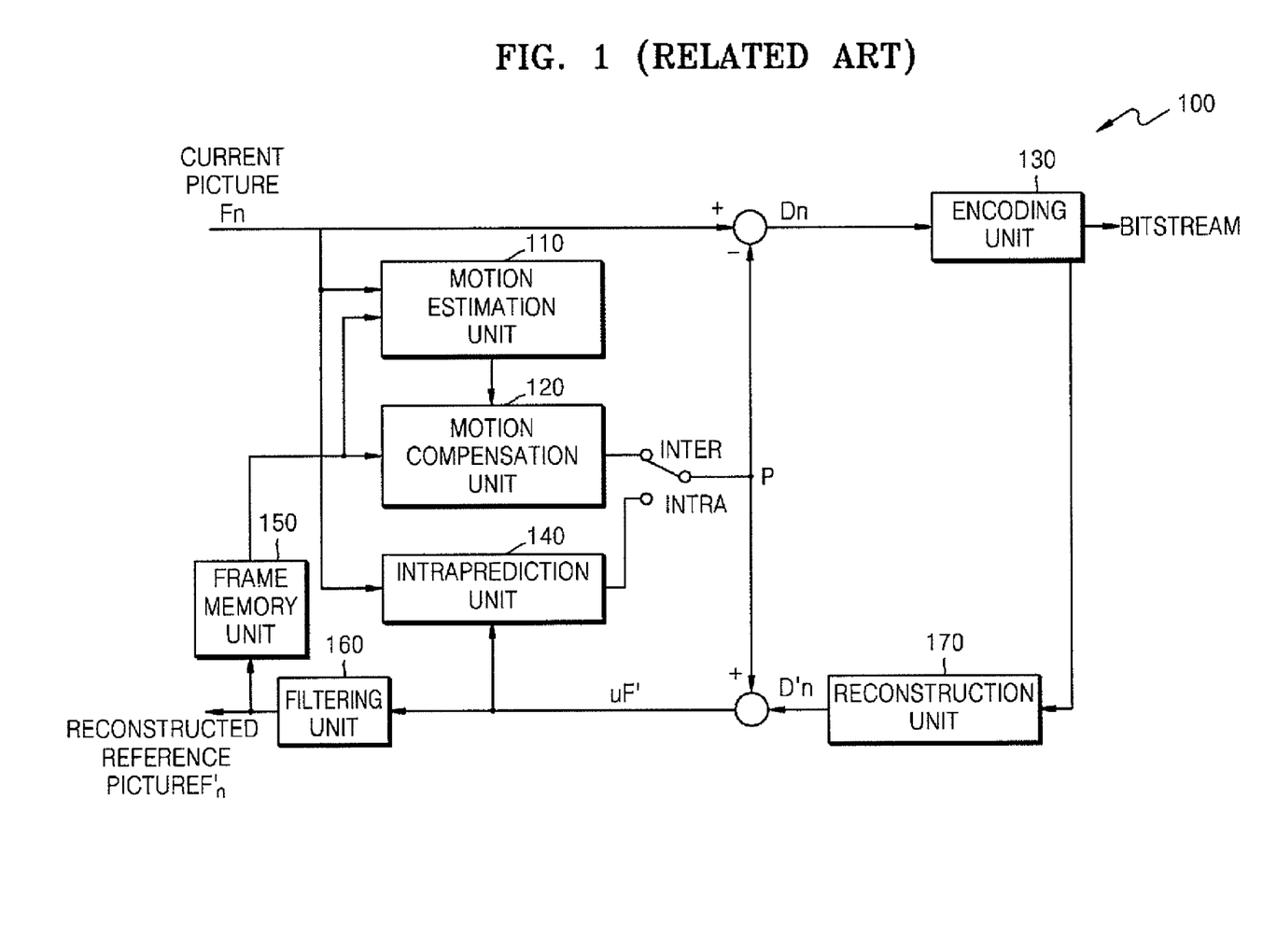
FIG. 1 is a block diagram of a conventional video encoder.

FIG. 1 is a block diagram of a conventional video encoder 100.

Referring to FIG. 1, a motion estimation unit 110 and a motion compensation unit 120 perform interprediction (also known as inter-frame prediction). The motion estimation unit 110 searches a reference picture stored in a frame memory unit 150 in order to generate a motion vector of a current block. The motion compensation unit 120 performs motion compensation on the current block in order to generate a prediction block of the current block.

An intraprediction unit 140 performs intraprediction (also known as intra-frame prediction) on the current block using the pixels included in a previously encoded region that is adjacent to the current block in order to generate a prediction block similar to interprediction.

The prediction block generated by the motion compensation unit 120 or the intraprediction unit 140 is subtracted from the current block in order to generate a residual block. The encoding unit 130 encodes the generated residual block, and then the generated residual block is inserted into a bitstream.

The reconstruction unit 170 reconstructs the residual block encoded by the encoding unit 130, and then the reconstructed block is added to the prediction block. The filter unit 150 deblocking-filters the reconstructed block and the frame memory unit 150 stores the reconstructed block.

The encoding unit 130 performs encoding as follows. First, the encoding unit 130 performs discrete cosine transformation (DCT) on residual values included in the residual block. The encoding unit 130 then quantizes DCT coefficients generated by the DCT. The encoding unit 130 then performs entropy-encoding on the quantized DCT coefficients and inserts them into the bitstream.

Conventional encoding performs DCT on all the residual values included in the residual block in order to generate DCT coefficients. However, residual values for adjacent pixels are likely to have a spatial correlation with each other. By using the spatial correlation, the residual block can be reconstructed during decoding without performing DCT on all the residual values.

SUMMARY OF THE INVENTION

The present invention provides a video encoding method and apparatus and a video decoding method and apparatus, in which only the minimum information for reconstruction of a residual block is encoded and decoded using resizing of the residual block, and a computer-readable recording medium having recorded thereon a program for executing the video encoding method and the video decoding method.

According to an aspect of the present invention, there is provided a video encoding method including generating a prediction block of a current block and subtracting the generated prediction block from the current block in order to produce a residual block of the current block, sub-sampling residual values for a plurality of pixels included in the residual block in order to select first residual values to be encoded from among the residual values, and encoding the first residual values.

The first residual values may be included in at least one of even rows and even columns of the current block.

The selecting of the first residual values to be encoded may include shifting the first residual values to the top portion and to the left portion of the current block, and the encoding of the first residual values comprises performing discrete cosine transformation (DCT) on the shifted first residual values.

According to another aspect of the present invention, there is provided a video encoding method including generating a prediction block of a current block and subtracting the generated prediction block from the current block in order to produce a residual block of the current block, down-sampling residual values for a plurality of pixels included in the residual block, and encoding the down-sampled residual values.

According to another aspect of the present invention, there is provided a video encoding apparatus including a residue generation unit that generates a prediction block of a current block and subtracts the generated prediction block from the current block in order to produce a residual block of the current block, a sampling unit that sub-samples residual values for a plurality of pixels included in the residual block in order to select first residual values to be encoded from among the residual values, and an encoding unit that encodes the first residual values.

According to another aspect of the present invention, there is provided a video encoding apparatus including a residue generation unit that generates a prediction block of a current block and subtracts the generated prediction block from the current block in order to produce a residual block of the current block, a sampling unit that down-samples residual values for a plurality of pixels included in the residual block, and an encoding unit that encodes the down-sampled residual values.

According to another aspect of the present invention, there is provided a video decoding method including receiving a bitstream including data of a current block and extracting a residual block of the residual block from the received bitstream, wherein the residual block includes sub-sampled residual values, reconstructing remaining residual values of the extracted residual block based on the sub-sampled residual values included in the extracted residual block, and reconstructing the current block based on the sub-sampled residual values and the reconstructed residual values.

The reconstructing of the remaining residual values may include performing interpolation based on the sub-sampled residual values.

The reconstructing of the remaining residual values may include rearranging the sub-sampled residual values to the original position before sub-sampling and reconstructing the remaining residual values based on the rearranged residual values.

According to another aspect of the present invention, there is provided a video decoding method including receiving a bitstream including data of a current block and extracting a residual block of the current block from the received bitstream, wherein the residual block includes down-sampled residual values, performing up-sampling based on down-sampled residual values included in the extracted residual block, and reconstructing the current block based on the up-sampled residual values.

According to another aspect of the present invention, there is provided a video decoding apparatus including a decoding unit that receives a bitstream including data of a residual block and extracts a residual block of the current block from the received bitstream, wherein the residual block includes sub-sampled residual values, a residue reconstruction unit that reconstructs remaining residual values of the extracted residual block based on sub-sampled residual values included in the extracted residual block, and a reconstruction unit that reconstructs the current block based on the sub-sampled residual values and the reconstructed residual values.

According to another aspect of the present invention, there is provided a video decoding apparatus including a decoding unit that receives a bitstream including data of a residual block and extracts a residual block of the current block from the received bitstream, wherein the current block includes down-sampled residual values, a residue reconstruction unit that performs up-sampling based on the down-sampled residual values included in the extracted residual block, and a reconstruction unit that reconstructs the current block based on the up-sampled residual values.

According to another aspect of the present invention, there is provided a computer-readable recording medium having recorded thereon a program for executing the video encoding method and the video decoding method.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, exemplary embodiments of the present invention will be described in detail with reference to the accompanying drawings. It should be noted that like reference numerals refer to like elements illustrated in one or more of the drawings. In the following description of the present invention, a detailed description of known functions and configurations incorporated herein will be omitted for conciseness and clarity.

Figure 2:
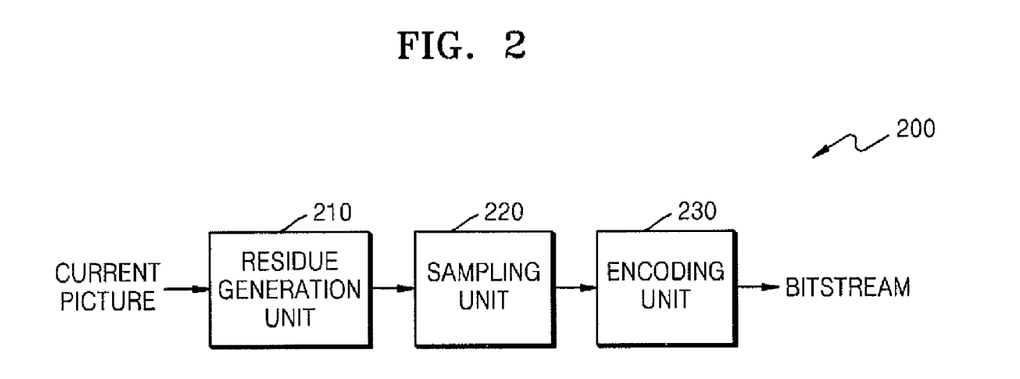
FIG. 2 is a block diagram of a video encoding apparatus according to an exemplary embodiment of the present invention.

FIG. 2 is a block diagram of a video encoding apparatus 200 according to an exemplary embodiment of the present invention.

Referring to FIG. 2, the video encoding apparatus 200 includes a residue generation unit 210, a sampling unit 220, and an encoding unit 230.

The residue generation unit 210 generates a residual block of a current block included in the current picture. To this end, the residue generation unit 210 generates a prediction block of the current block by performing intraprediction or inter-prediction on the current block and subtracts the prediction block from the current block in order to generate the residual block of the current block. The residual block includes residual values for pixels of the current block.

The sampling unit 220 resizes the residual block generated by the residue generation unit 210. The sampling unit 220 performs sub-sampling or down-sampling on the residual values included in the residual block. The sampling unit 220 may perform sub-sampling for selecting only some of the residual values, which are to be encoded, or may perform down-sampling for reducing the number of residual values, as will be described in detail with reference to FIGS. 3A through 3F.

Figure 3A:
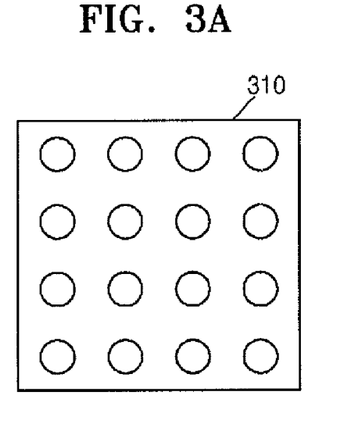
FIGS. 3A through 3F are views illustrating resizing of a residual block according to an exemplary embodiment of the present invention.

FIGS. 3A through 3F are views illustrating resizing of the residual block according to an exemplary embodiment of the present invention. FIG. 3A illustrates a residual block 310 of the current block, which is generated by the residue generation unit 210. Here, it is assumed that the residual block 310 is a 4×4 block.

FIGS. 3B through 3E show a case where residual values included in the residual block 310 are sub-sampled. FIG. 3F shows a case where the residual values are down-sampled.

Figure 3B:
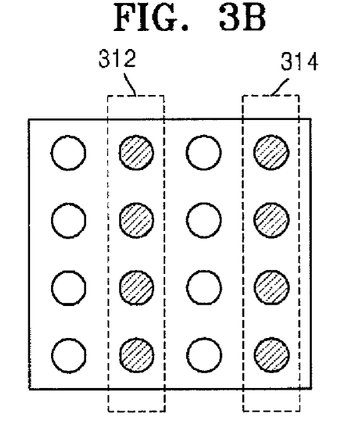

In FIG. 3B, the sampling unit 220 selects residual values included in even columns 312 and 314 as residual values to be encoded from the residual block 310. This sub-sampling is appropriate for a case where residual values included in the residual block 310 do not change horizontally, but change by a large amount vertically.

Figure 3C:
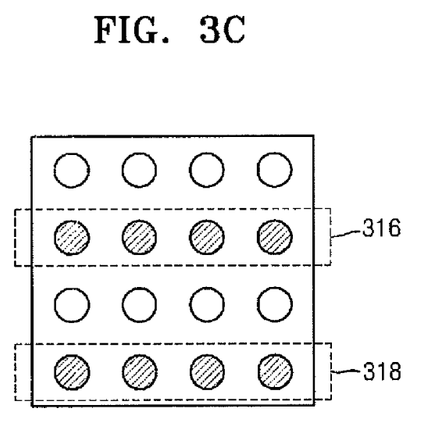

In FIG. 3C, the sampling unit 220 selects residual values included in even rows 316 and 318 as residual values to be encoded from the residual block 310. This sub-sampling is appropriate for a case where residual values included in the residual block 310 do not change vertically, but change by a large amount horizontally.

Figure 3D:
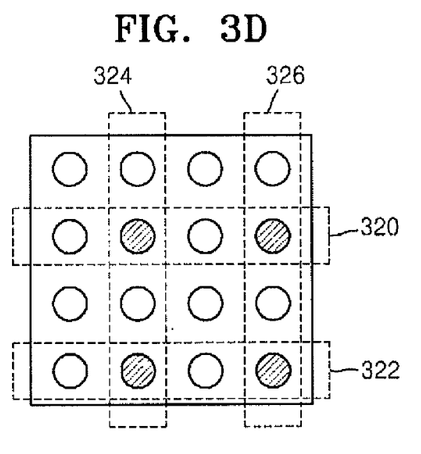

In FIG. 3D, the sampling unit 220 selects residual values included in even rows 320 and 322 and even columns 324 and 326 as residual values to be encoded from the residual block 310.

Figure 3E:
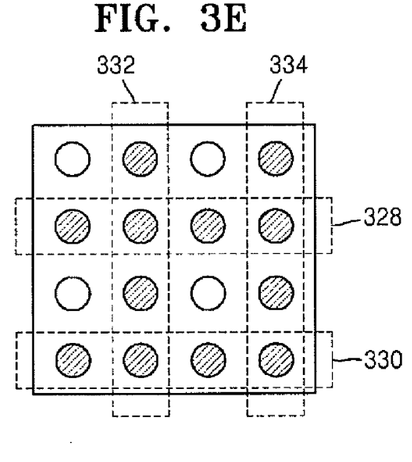
Figure 3F:
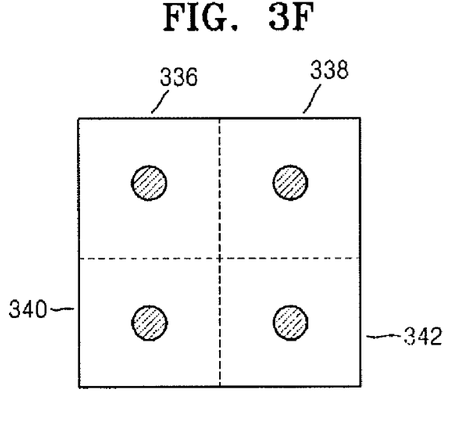

In FIG. 3E, the sampling unit 220 selects residual values included in even rows 328 and 330 or even columns 332 and 334 as residual values to be encoded from the residual block 310.

Although sub-sampling is performed by selecting residual values included in at least one of even rows and even columns in FIGS. 3B through 3E, it may also be performed by selecting residual values included in at least one of odd rows and odd columns.

Residual values to be encoded may also be selected using a gradient map of the prediction block. In the gradient map, pixels having large gradient values are included in a portion having large residual values, such as an edge or a texture. Thus, the residual values are selected using the gradient map in order to encode only residual values of those pixels. At this time, it is not necessary to separately encode gradient map information because the gradient map of the prediction block is used instead of the gradient map of the current block.

In FIG. 3F, the sampling unit 220 performs down-sampling on the residual values included in the residual block 310. To this end, the sampling unit 220 calculates an average value of pixels included in each of 2×2 sub-blocks 336 through 342 included in the residual block 310 and sets the calculated average value as a new residual value. For example, the sampling unit 220 calculates an average value of four pixels included in the sub-block 336 located in an upper-left portion of the residual block 310 and sets the calculated average value as a new residual value. Similarly, the sampling unit 220 performs down-sampling on the other sub-blocks 338 through 342 in order to generate four residual values to be encoded.

Referring back to FIG. 2, the sampling unit 220 shifts the sub-sampled or down-sampled pixels as illustrated in FIGS. 3B through 3F to the top portion or to the left portion of the current block, as will be described in detail with reference to FIGS. 4A through 4D.

Figure 4A:
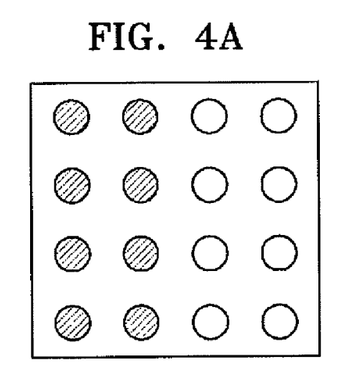
FIGS. 4A through 4D illustrate shifted residual blocks according to an exemplary embodiment of the present invention.
Figure 4B:
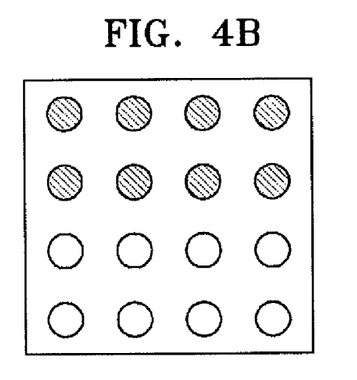

When the residual values included in the even columns 312 and 314 are selected as illustrated in FIG. 3B, the selected residual values are shifted to the left portion of the current block as illustrated in FIG. 4A. Similarly, when the residual values included in the even rows 316 and 318 are selected as illustrated in FIG. 3C, the selected residual values are shifted to the top portion of the current block as illustrated in FIG. 4B.

Figure 4C:
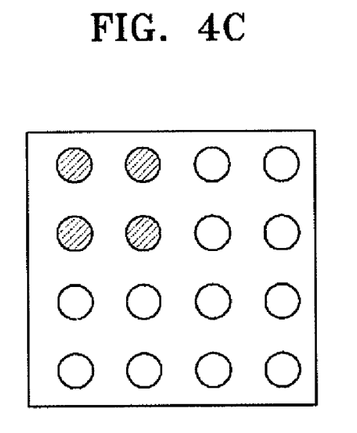

When the residual values included in the even columns 320 and 322 and in the even rows 324 and 326 are selected as illustrated in FIG. 3D, the selected four residual values are shifted to the top portion and to the left portion of the current block as illustrated in FIG. 4C. Similarly, when the new four residual values are generated by performing down-sampling as illustrated in FIG. 3F, the generated residual values may be shifted to the top portion and to the left portion of the current block as illustrated in FIG. 4C.

Figure 4D:
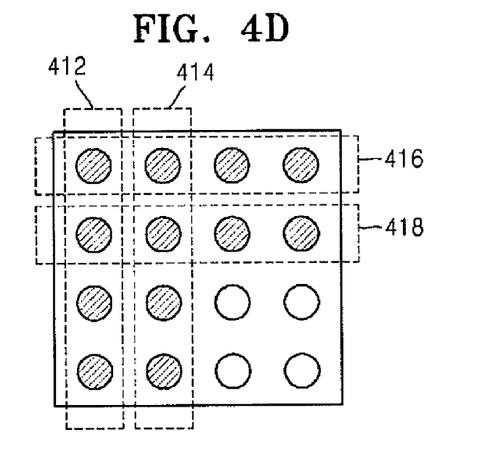

When the residual values included in the even rows 328 and 330 or the even columns 332 and 334 are selected as illustrated in FIG. 3E, the selected residual values may be shifted as illustrated in FIG. 4D. However, at this time, in order to perform encoding using vertical or horizontal correlation between the residual values, the residual values may be shifted in a different way.

For example, the pixels included in the even columns 332 and 334 illustrated in FIG. 3E may be shifted to two left columns 412 and 414 illustrated in FIG. 4D and then the remaining four pixels may be shifted to the remaining top portion and right portion of the current block.

The pixels included in the even rows 328 and 330 illustrated in FIG. 3E may be shifted to two top rows 416 and 418 as illustrated in FIG. 4D and then the remaining four pixels may be shifted to the remaining bottom portion and left portion of the current block.

According to another exemplary embodiment of the present invention, the sampling unit 220 may use residual values selected by sub-sampling without shifting the selected residual values, for prediction of non-selected residual values, as will be described in detail with reference to FIG. 5.

Figure 5:
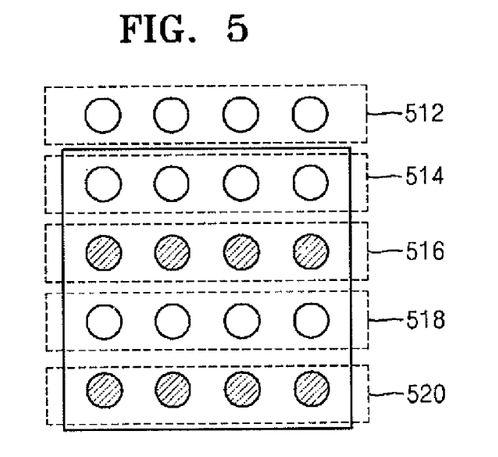
FIG. 5 is a view illustrating prediction of residual values according to an exemplary embodiment of the present invention.

FIG. 5 is a view illustrating prediction of residual values according to an exemplary embodiment of the present invention.

In FIG. 5, a case where the residual values included in the even row 316 or 318 are selected as residual values to be encoded will be used as an example. The sampling unit 220 performs interpolation using residual values of pixels in row 512 that are adjacent above the residual block and residual values included in the second row 516 in order to predict residual values included in the first row 514. The predicted residual values included in the first row 514 are subtracted from residual values included in the first row of the residual block 310 before sub-sampling in order to generate differential values.

Similarly, the sampling unit 220 predicts residual values included in the third row 518 using the residual values included in the second row 516 and residual values included in the fourth row 520 like the residual values included in the first row 514. The predicted residual values included in the third row 518 are subtracted from residual values included in the third row of the residual block 310 before sub-sampling in order to generate differential values.

For the residual values included in the first row 514 and in the third row 518, only differential values between the residual values predicted using interpolation and the original residual values are encoded in order to improve compression rate. For the sub-sampled residual values included in the second row 516 and in the fourth row 520, the original residual values are encoded.

Referring back to FIG. 2, the encoding unit 230 encodes the residual block that has been resized and shifted by the sampling unit 220. To this end, the encoding unit 230 performs DCT on the residual block illustrated in FIGS. 4A through 4D in order to generate DCT coefficients. At this time, when residual values included in the residual block are shifted to the top portion of and/or to the left portion of the current block as illustrated in FIGS. 4A through 4D, it is desirable to perform DCT in units of 2×2 sub-blocks.

The generated DCT coefficients are inserted into a bit-stream after being quantized and entropy-encoded.

Figure 6:
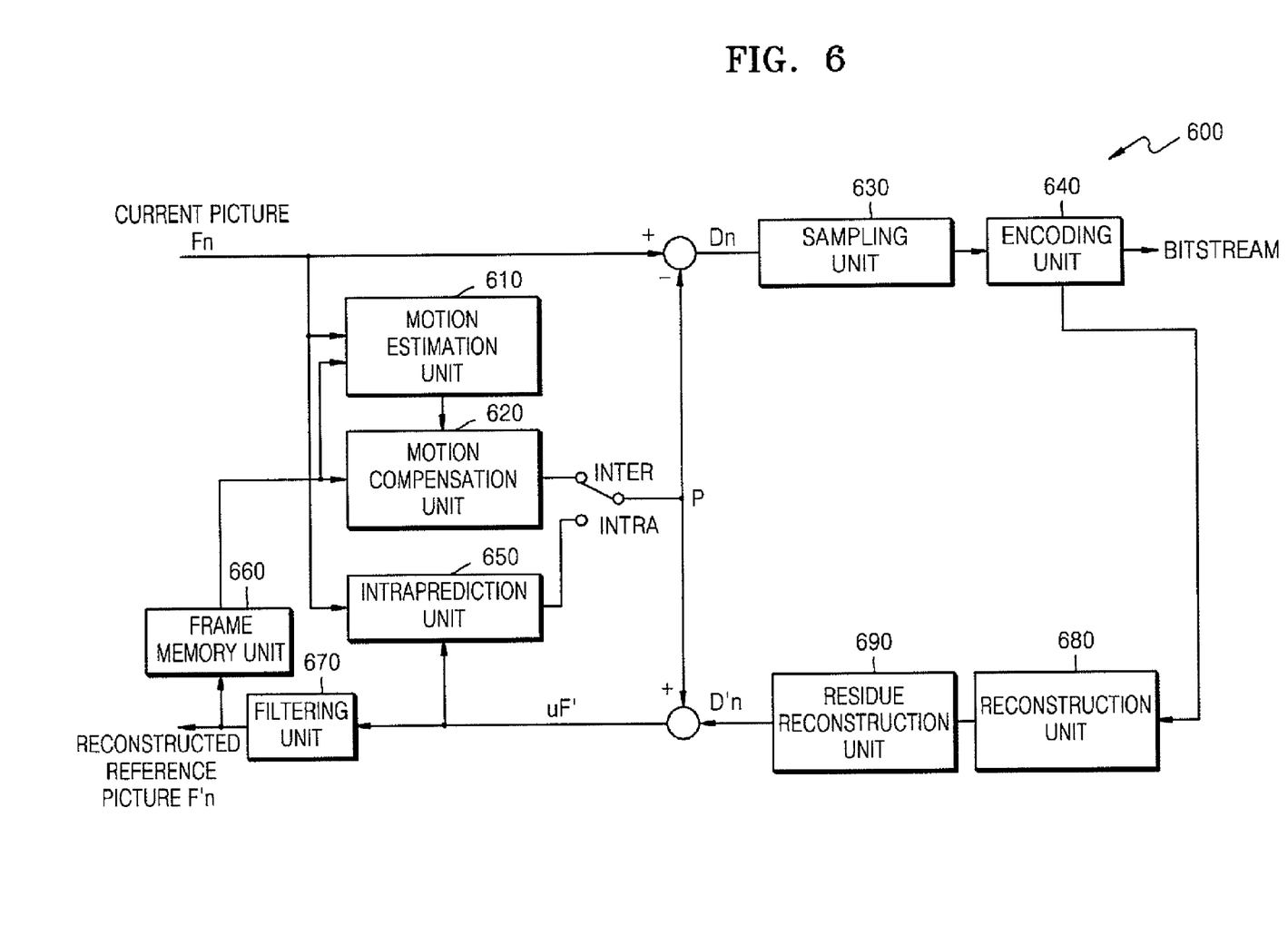
FIG. 6 is a block diagram of a video encoding apparatus according to another exemplary embodiment of the present invention.

FIG. 6 is a block diagram of a video encoding apparatus 600 according to another exemplary embodiment of the present invention.

Referring to FIG. 6, the video encoding apparatus 600 includes a motion estimation unit 610, a motion compensation unit 620, a sampling unit 630, an encoding unit 640, an intraprediction unit 650, a frame memory unit 660, a filtering unit 670, a reconstruction unit 680, and a residue reconstruction unit 690.

The motion estimation unit 610 estimates a motion vector of the current block by searching a reference picture stored in the frame memory unit 660. Upon generation of the motion vector, the motion compensation unit 620 generates a prediction block of the current block by performing motion compensation on the current block using the generated motion vector.

The intraprediction unit 650 performs intraprediction on the current block using pixels included in a previously encoded region that is adjacent to the current block. Like the motion compensation unit 620, the intraprediction unit 650 generates a prediction block of the current block by performing the intraprediction.

The prediction block generated by the motion compensation unit 620 or the intraprediction unit 650 is subtracted from the current block in order to generate a residual block. The residual block is resized by the sampling unit 630 and then is encoded by the encoding unit 640. The sampling unit 630 functions in the same manner as the sampling unit 220 illustrated in FIG. 2 and the encoding unit 640 functions in the same manner as the encoding unit 230 illustrated in FIG. 2.

The reconstruction unit 680 performs inverse quantization and inverse DCT (IDCT) after the encoding unit 640 performs DCT and quantizes the residual block. The residue reconstruction unit 690 reconstructs the original residual block before resizing the resized residual block that has been reconstructed by the reconstruction unit 680. The residue reconstruction unit 690 will be described in more detail in a description regarding a residue reconstruction unit 820 of a video decoder 800 illustrated in FIG. 8.

Once the original residual block before resizing is reconstructed, the reconstructed residual block is added to the prediction block in order to be stored in the frame memory unit 660. Before the addition result is stored in the frame memory 660, it is deblocking-filtered by the filtering unit 670.

Figure 7:
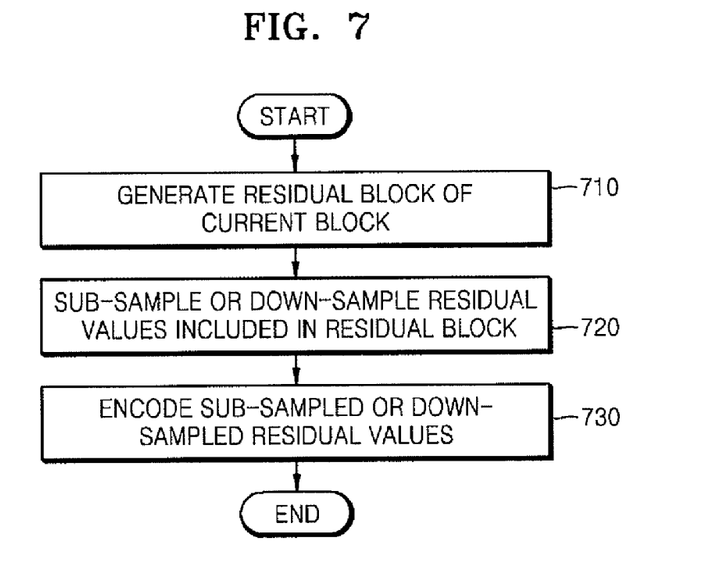
FIG. 7 is a flowchart illustrating a video encoding method according to an exemplary embodiment of the present invention.

FIG. 7 is a flowchart illustrating a video encoding method according to an exemplary embodiment of the present invention.

Referring to FIG. 7, the video encoding apparatus 200 or 600 according to exemplary embodiments of the present invention generates a residual block of the current block in operation 710. More specifically, the prediction block of the current block is generated using intraprediction or interprediction and the generated prediction block is subtracted from the current block in order to generate the residual block of the current block.

In operation 720, the video encoding apparatus 200 or 600 resizes the generated residual block. More specifically, residual values included in the residual block are sub-sampled or down-sampled in order to resize the residual block.

In operation 730, the video encoding apparatus 200 or 600 encodes the resized residual values. In other words, the sub-sampled or down-sampled residual values are encoded.

Although the residual values included in the residual block 310 are resized for encoding in FIGS. 2 through 7, DCT coefficients of the residual values may also be resized in order to resize the residual block.

For example, only some DCT coefficients generated by DCT with respect to the residual values, which are included in at least one of even rows and even columns, may be quantized and entropy-coded in order to be inserted into a bitstream. Alternatively, only DCT coefficients with respect to a low frequency cosine function may be encoded and then inserted into a bitstream.

Figure 8:
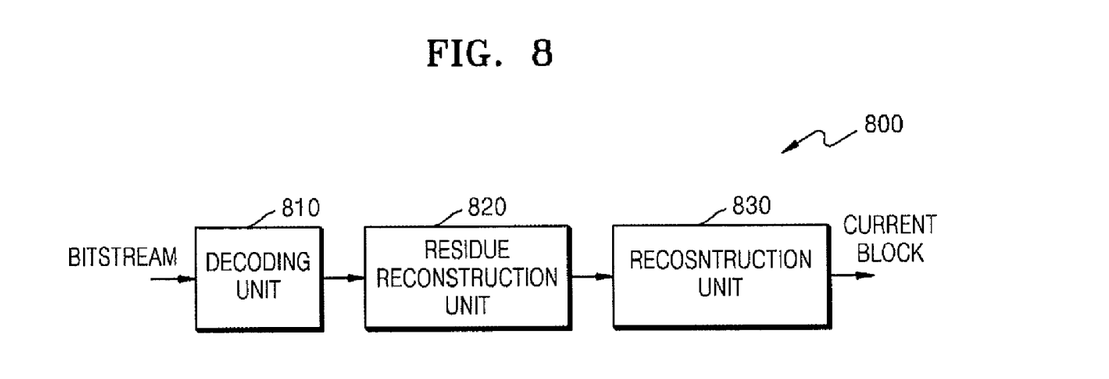
FIG. 8 is a block diagram of a video decoding apparatus according to an exemplary embodiment of the present invention.

FIG. 8 is a block diagram of a video decoding apparatus 800 according to an exemplary embodiment of the present invention.

Referring to FIG. 8, the video decoding apparatus 800 includes a decoding unit 810, a residue reconstruction unit 820, and a reconstruction unit 830.

The decoding unit 810 receives a bitstream including data of the current block and extracts data of a residual block of the current block from the received bitstream.

To this end, the decoding unit 810 performs entropy-decoding, inverse quantization, and IDCT on the data of the current block in order to extract data from the residual block, i.e., residual values. More specifically, the decoding unit 810 extracts the residual values included in the resized residual block.

The residue reconstruction unit 820 reconstructs the residual block before resizing based on the resized residual block that has been extracted by the decoding unit 810. More specifically, the residue reconstruction unit 820 may reconstruct the remaining residual values of the residual block based on sub-sampled residual values or reconstruct the remaining residual values of the residual block by performing up-sampling based on down-sampled residual values. When residual values are sub-sampled, they have been transformed by DCT after being shifted. Therefore, the residual values are re-arranged to the original position before shifting and then the remaining residual values are reconstructed based on the re-arranged residual values, as will be described in detail with reference to FIGS. 9A through 9D.

FIGS. 9A through 9D are views illustrating reconstruction of a residual block according to an exemplary embodiment of the present invention.

Figure 9A:
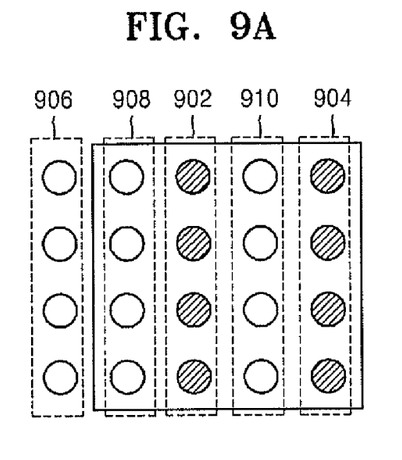
FIGS. 9A through 9D are views illustrating reconstruction of a residual block according to an exemplary embodiment of the present invention.

FIG. 9A is a view illustrating reconstruction of a residual block when only the residual values included in the even columns 312 and 314 as illustrated in FIG. 3B have been encoded.

Referring to FIG. 9A, once the decoding unit 810 decodes data of the current block in order to reconstruct residual values of even columns 902 and 904, it reconstructs residual values of the remaining columns 908 and 910 based on the reconstructed residual values.

More specifically, the decoding unit 810 reconstructs the residual values of the first column 908 by performing interpolation using the residual values of the second column 902 and residual values of pixels of a previously decoded column 906 that is adjacent and to the left of the current block.

The decoding unit 810 reconstructs the residual values of the third column 910 by performing interpolation using the residual values of the second column 902 and the residual values of the fourth column 904.

Figure 9B:
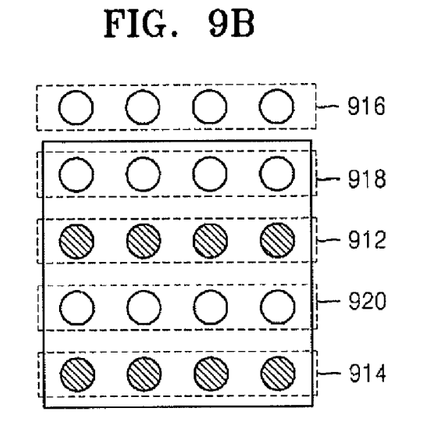

Referring to FIG. 9B, once the decoding unit 810 decodes data of the current block in order to reconstruct residual values of even rows 912 and 914, it reconstructs residual values of the remaining rows 918 and 920 based on the reconstructed residual values.

More specifically, the decoding unit 810 reconstructs the residual values of the first row 918 by performing interpolation using the residual values of the second row 912 and residual values of pixels of a previously decoded row 916 that is adjacent and above the current block.

The decoding unit 810 reconstructs the residual values of the third row 920 by performing interpolation using the residual values of the second row 912 and the residual values of the fourth row 914.

Figure 9C:
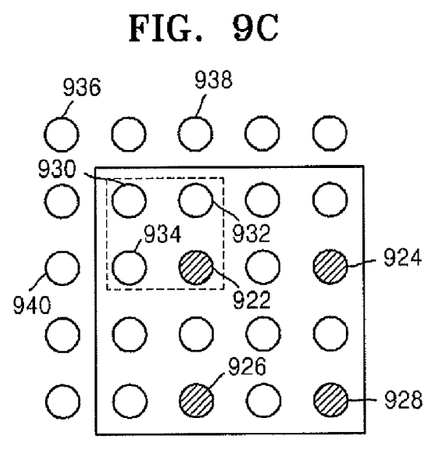

Referring to FIG. 9C, once the decoding unit 810 decodes data of the current block in order to reconstruct residual values 922, 924, 926, and 928 of an even row and an even column, it reconstructs the remaining residual values of the residual block based on the reconstructed residual values.

Residual values included in a 2×2 sub-block located in the upper-left portion of the current block will be used as an example. A residual value 930 located in the upper-left portion of the 2×2 sub-block is reconstructed by performing interpolation using the reconstructed residual value 922 and a residual value 936 of a previously decoded pixel that is adjacent to the left and above the current block.

A residual value 932 located in the upper-right portion of the 2×2 sub-block is reconstructed by performing interpolation using the reconstructed residual value 922 and a residual value 938 of a previously decoded pixel that is adjacent and above the current block.

A residual value 934 located in the lower-left portion of the 2×2 sub-block is reconstructed by performing interpolation using the reconstructed residual value 922 and a residual value 940 of a previously decoded pixel that is adjacent and to the left of the current block.

The other residual values may be reconstructed by performing interpolation in the same manner as in the 2×2 sub-block.

Figure 9D:
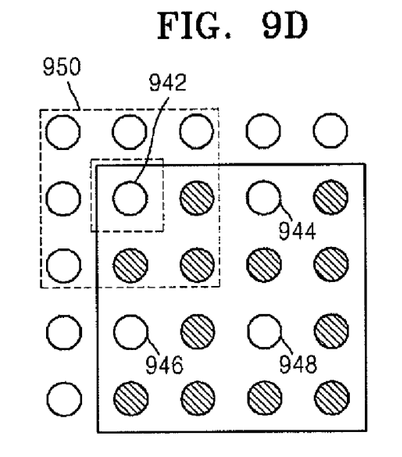

Referring to FIG. 9D, once the decoding unit 810 reconstructs the data of the current block and then reconstructs the residual values of an even row or an even column, it reconstructs the remaining four residual values of the residual block based on the reconstructed residual values.

The four residual values 942 through 948 that have not been reconstructed are reconstructed by performing interpolation based on residual values that are adjacent to each of the four residual values 942 through 948. The residual value 942 of a pixel located in the upper-left portion of the current block will be used as an example. A total of 8 residual values 950 are adjacent to the residual value 942. Among the 8 residual values 950, the 5 residual values that are adjacent and to the left or adjacent and above the residual value 942 are included in a previously decoded region, and the remaining 3 residual values that are adjacent and to the right or adjacent and below the residual value 942 have been reconstructed by the decoding unit 810.

The interpolation is performed by setting an average value of the neighboring residual values 950 to a new residual value 942.

In FIGS. 9A through 9D, the interpolation is performed using residual values of pixels included in a previously decoded region that is adjacent to the current block, but other neighboring pixel values may also be used for the interpolation as will be easily understood by those of ordinary skill in the art.

For example, interpolation may be performed after setting pixel values of all the neighboring pixels to '0'. In this case, interpolation may be performed after setting pixel values of neighboring pixels that are adjacent and to the right and adjacent and below the current block to '0', instead of by using pixel values of neighboring pixels that are adjacent and to the left and adjacent and above the current block.

When the current block has been encoded using interprediction, a reference block may be searched for according to a motion vector of the current block and interpolation may be performed using residual values of neighboring pixels that are adjacent to the found block. More specifically, information about the motion vector of the current block is extracted from the bitstream and the reference block is searched for according to the motion vector in order to search for a prediction block of the current block. Residual values of neighboring pixels that are adjacent to the found prediction block are set as residual values of neighboring pixels that are adjacent to the current block and then interpolation is performed.

FIGS. 9A through 9D are views for explaining the reconstruction of the remaining residual values based on sub-sampled residual values as illustrated in FIGS. 3B through 3E.

When the residual values have been down-sampled as illustrated in FIG. 3F, they are up-sampled by being set as residual values included in each sub-block in order to reconstruct a residual block.

For example, the down-sampled residual values generated for the sub-block 336 located in the upper-left portion of the residual block 310 are used as the residual values of four pixels included in the sub-block 336 before down-sampling in order to up-sample the down-sampled residual values.

However, the reconstruction of the residual block using interpolation, which is illustrated in FIGS. 9A through 9D, is only an example, and the residual block may be reconstructed in other ways as will be easily understood by those of ordinary skill in the art.

For example, some of the residual values decoded by the decoding unit 810 may be copied to their neighboring residual values in order to reconstruct the residual block. When the residual values of the even column 902 or 904 have been decoded as illustrated in FIG. 9A, the residual values of the second column 902 may be copied to the first column 908 and the residual values of the fourth column 904 may be copied to the third column 910 in order to reconstruct the residual block. When the residual values of the even row 912 or 914 have been decoded as illustrated in FIG. 9B, the residual values of the second row 912 may be copied to the first row 918 and the residual values of the fourth row 914 may be copied to the third row 920 in order to reconstruct the residual block.

The residual block may also be reconstructed by setting the remaining residual values to '0' instead of performing interpolation or copying some of the decoded residual values. The reconstructed residual block may not have a significant error even if it is reconstructed by setting the residual values to '0' because an error between the original residual values and prediction residual values does not have a great influence upon the original residual block.

The remaining residual values may also be reconstructed by searching a reference picture or a previously decoded region of the current picture using some of the decoded residual values. More specifically, residual values having a similar pattern are searched for in the reference picture or the previously decoded region only using some of the decoded residual values, and the remaining residual values are reconstructed according to the search result.

When some of the residual values have been selected as residual values to be encoded, the remaining residual values have been predicted from the selected residual values, and only differential values between the predicted residual values and the original residual values have been encoded as described with reference to FIG. 5, the residual block is reconstructed in a different way than ways described above. Like in FIG. 5, a case where residual values are sub-sampled as illustrated in FIG. 3C will be used as an example.

The residue reconstruction unit 820 first reconstructs residual values included in an odd row based on sub-sampled residual values that have been decoded by the decoding unit 810, i.e., residual values included in an even row. At this time, as mentioned above, the residue reconstruction unit 820 may reconstruct the residual values included in an odd row by performing interpolation using residual values included in an even row and residual values of neighboring pixels that are adjacent and above the current block.

Next, the residue reconstruction unit 820 reconstructs the odd row by adding prediction values of the decoded residual values to the reconstructed residual values. As set forth above, with reference to FIG. 5, the remaining residual values of the residual block except for the sub-sampled residual values are prediction-encoded and inserted into a bitstream. Thus, the prediction values of the remaining residual values are first generated based on the sub-sampled residual values and are added to differential values inserted into the bitstream in order to reconstruct the original residual values.

Referring back to FIG. 8, the reconstruction unit 830 reconstructs the current block based on the residual block reconstructed by the residue reconstruction unit 820. More specifically, the reconstruction unit 830 reconstructs the current block based on the sub-sampled residual values decoded by the decoding unit 810 and the remaining residual values reconstructed by the residue reconstruction unit 820.

The reconstruction unit 830 then generates a prediction block of the current block by performing intraprediction or interprediction and adds the generated prediction block to the residual block in order to reconstruct the current block.

Figure 10:
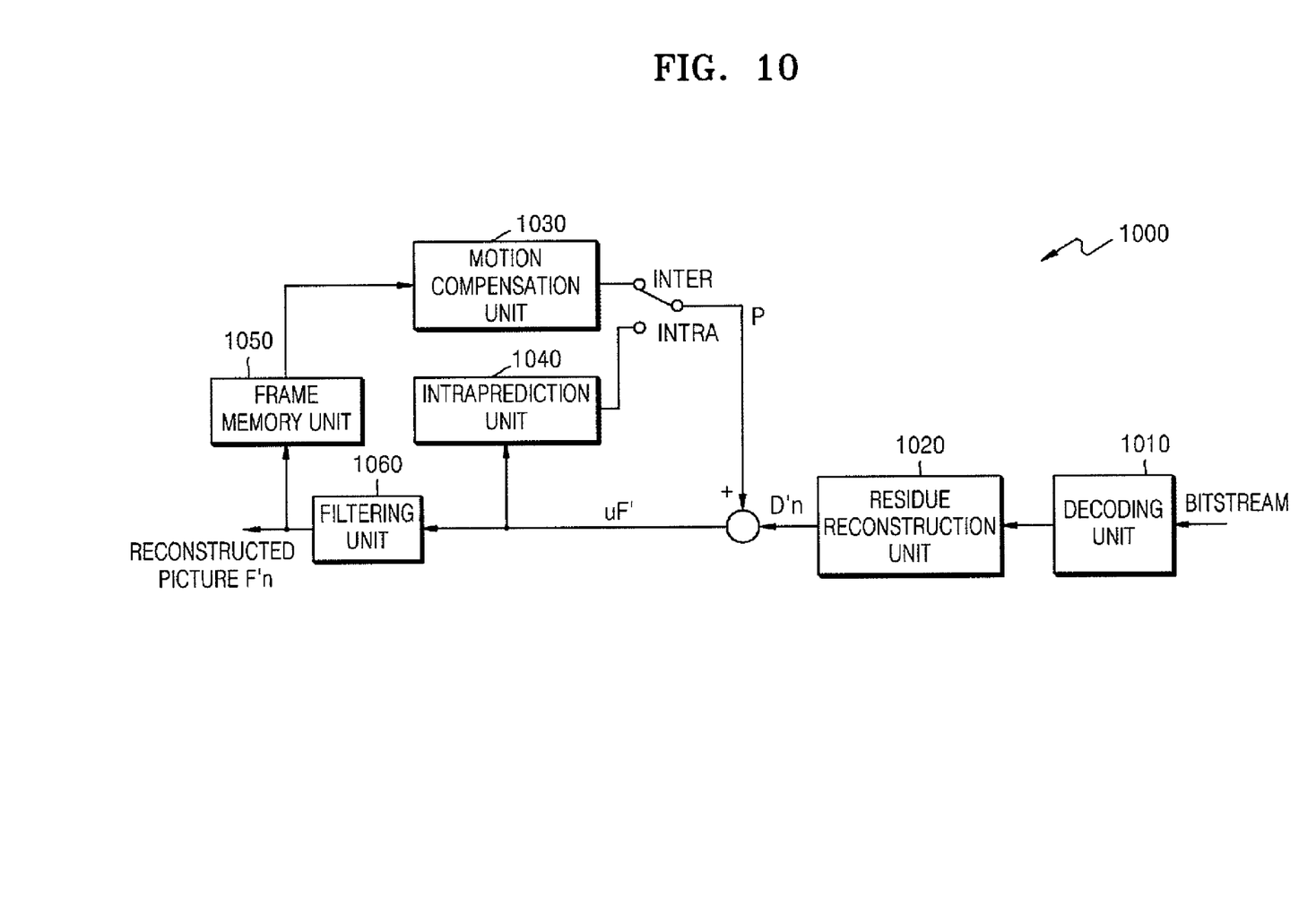
FIG. 10 is a block diagram of a video decoding apparatus according to another exemplary embodiment of the present invention.

FIG. 10 is a block diagram of a video decoding apparatus 1000 according to another exemplary embodiment of the present invention.

Referring to FIG. 10, the video decoding apparatus 1000 according to another exemplary embodiment of the present invention includes a decoding unit 1010, a residue reconstruction unit 1020, a motion compensation unit 1030, an intraprediction unit 1040, a frame memory unit 1050, and a filtering unit 1060.

The decoding unit 1010 functions in the same manner as the decoding unit 810 illustrated in FIG. 9. The decoding unit 1010 receives a bitstream including data of the current block and extracts data of a residual block of the current block from the received bitstream.

The residue reconstruction unit 1020 functions in the same manner as the residue reconstruction unit 820 illustrated in FIG. 8. The residue reconstruction unit 1020 reconstructs a residual block before resizing based on the resized residual block extracted by the decoding unit 1010.

The reconstructed residual block is added to a prediction block that is generated by the motion compensation unit 1030 or the intraprediction unit 1040 in order to be reconstructed as the current block. The motion compensation unit 1030 searches a reference picture stored in the frame memory unit 1050 in order to perform interprediction on the current block, and the intraprediction unit 1040 performs intraprediction using pixels included in a previously decoded region that is adjacent to the current block.

The reconstructed current block is deblocking-filtered by the filtering unit 1060 and then stored in the frame memory unit 1050.

Figure 11:
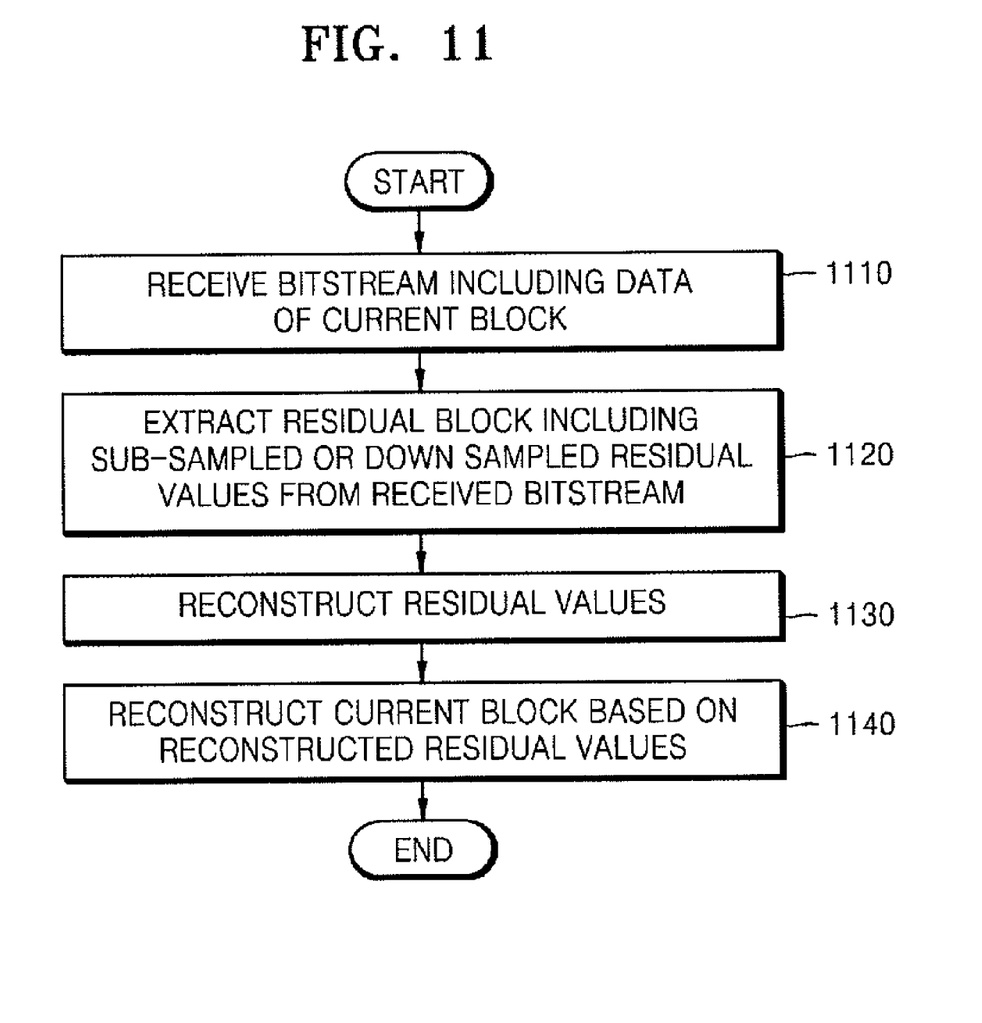
FIG. 11 is a flowchart illustrating a video decoding method according to an exemplary embodiment of the present invention.

FIG. 11 is a flowchart illustrating a video decoding method according to an exemplary embodiment of the present invention.

Referring to FIG. 11, the video decoding apparatus 800 or 1000 according to the exemplary embodiments of the present invention receives a bitstream including data of the current block in operation 1110. The data of the current block is data of a residual block of the current block.

In operation 1120, the video decoding apparatus 800 or 1000 extracts the data of the residual block from the received bitstream. The residual block has been resized, i.e., its residual values have been sub-sampled or down-sampled.

In operation 1130, the video decoding apparatus 800 or 1000 reconstructs the residual block based on the resized residual block extracted in operation 1120. More specifically, the remaining residual values may be reconstructed using sub-sampled residual values or may be reconstructed by performing up-sampling using down-sampled residual values. When the residual values have been sub-sampled, they have been transformed by DCT after being shifted. Therefore, in this case, the residual values are rearranged to the original position before shift and then the remaining residual values are reconstructed based on the rearranged residual values.

In operation 1140, the video decoding apparatus 800 or 1000 reconstructs the current block based on the residual values reconstructed in operation 1130. More specifically, a prediction block is added to the residual block reconstructed in operation 1130 in order to reconstruct the current block.

In FIGS. 8 through 11, the residual block whose residual values have been resized is decoded. However, it can be easily understood by those of ordinary skill in the art that the video decoding method and apparatus illustrated in FIGS. 8 through 11 may also be used to decode a residual block whose DCT coefficients have been resized.

As described above, according to the present invention, only the minimum information required for reconstruction of a residual block is encoded for prediction-encoding of the current block in order to improve the compression rate of video encoding.

Meanwhile, the present invention can be embodied as code that is readable by a computer on a computer-readable recording medium. The computer-readable recording medium includes all kinds of recording devices storing data that are readable by a computer system. Examples of the computer-readable recording medium include read-only memory (ROM), random access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A video decoding method comprising:
   receiving a bitstream including data of a current block and extracting a residual block of the current block from the received bitstream;
   wherein the residual block includes sub-sampled residual values;
   reconstructing remaining residual values of the extracted residual block based on the sub-sampled residual values included in the extracted residual block; and
   reconstructing the current block based on the sub-sampled residual values and the reconstructed residual values.

2. The video decoding method of claim 1, wherein the reconstructing of the remaining residual values comprises performing interpolation based on the sub-sampled residual values.

3. The video decoding method of claim 1, wherein the reconstructing of the remaining residual values comprises copying the sub-sampled residual values to other residual values that are adjacent to each of the sub-sampled residual values.

4. The video decoding method of claim 1, wherein the reconstructing of the remaining residual values comprises setting the remaining residual values except for the sub-sampled residual values to 0.

5. The video decoding method of claim 1, wherein the reconstructing of the remaining residual values comprises:
   rearranging the sub-sampled residual values to the original position before sub-sampling; and
   reconstructing the remaining residual values based on the rearranged residual values.

6. A video decoding method comprising:
   receiving a bitstream including data of a current block and extracting a residual block of the current block from the received bitstream;

wherein the residual block includes down-sampled residual values;

performing up-sampling based on down-sampled residual values included in the extracted residual block; and reconstructing the current block based on the up-sampled residual values.

7. A video decoding apparatus comprising:

a decoding unit which receives a bitstream including data of a current block and which extracts a residual block of the current block from the received bitstream;

wherein the residual block includes sub-sampled residual values;

a residue reconstruction unit which reconstructs remaining residual values of the extracted residual block based on sub-sampled residual values included in the extracted residual block; and a reconstruction unit which reconstructs the current block based on the sub-sampled residual values and the reconstructed residual values.

8. The video decoding apparatus of claim 7, wherein the residue reconstruction unit performs interpolation based on the sub-sampled residual values.

9. The video decoding apparatus of claim 7, wherein the residue reconstruction unit copies the sub-sampled residual values to other residual values that are adjacent to each of the sub-sampled residual values.

10. The video decoding apparatus of claim 7, wherein the residue reconstruction unit sets the remaining residual values except for the sub-sampled residual values to 0.

11. The video decoding apparatus of claim 7, wherein the residue reconstruction unit rearranges the sub-sampled residual values to the original position before sub-sampling and reconstructs the remaining residual values based on the rearranged residual values.

12. A video decoding apparatus comprising:

a decoding unit which receives a bitstream including data of a current block and which extracts a residual block of the current block from the received bitstream;

wherein the residual block includes down-sampled residual values;

a residue reconstruction unit which performs up-sampling based on down-sampled residual values included in the extracted residual block; and a reconstruction unit which reconstructs the current block based on the up-sampled residual values.

13. A non-transitory computer-readable recording medium having recorded thereon a program for executing the video decoding method of claim 1.

* * * * *